United States Patent
Boyle et al.

(10) Patent No.: US 7,319,692 B2
(45) Date of Patent: Jan. 15, 2008

(54) SUBSCRIBER MOBILITY IN TELEPHONY SYSTEMS

(75) Inventors: Frank J. Boyle, Broomfield, CO (US); David L. Chavez, Thornton, CO (US); Kurt H. Haserodt, Westminster, CO (US); Stephen M. Milton, Freehold, NJ (US); Chandra M. Ravipati, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 578 days.

(21) Appl. No.: 10/370,845

(22) Filed: Feb. 21, 2003

(65) Prior Publication Data

US 2004/0165712 A1    Aug. 26, 2004

(51) Int. Cl.
*H04L 12/66* (2006.01)
*H04M 1/64* (2006.01)
*H04M 7/00* (2006.01)
*G06F 15/16* (2006.01)

(52) U.S. Cl. ............... 370/352; 370/353; 370/354; 370/355; 370/356; 379/88.17; 379/220.01; 379/221.01; 379/211.02; 709/203; 709/204

(58) Field of Classification Search .......... 379/220.01, 379/221.01; 370/352, 353, 354
See application file for complete search history.

(56) References Cited

U.S. PATENT DOCUMENTS

| | | | |
|---|---|---|---|
| 4,086,438 A | 4/1978 | Kahn et al. | |
| 4,277,649 A * | 7/1981 | Sheinbein | 379/211.02 |
| 4,918,721 A | 4/1990 | Hashimoto | |
| 5,206,903 A | 4/1993 | Kohler et al. | |
| 5,247,571 A | 9/1993 | Kay et al. | 379/221 |
| 5,339,356 A | 8/1994 | Ishii | 379/234 |
| 5,386,459 A | 1/1995 | Veeneman et al. | 379/93 |
| 5,404,395 A | 4/1995 | Bogart et al. | 379/201 |
| 5,425,077 A | 6/1995 | Tsoi | 455/566 |

(Continued)

FOREIGN PATENT DOCUMENTS

EP      0980176 A1     2/2000

(Continued)

OTHER PUBLICATIONS

Avaya Inc.'s "Multivantage™ Software: Product Summary" at http://www.avaya.com/ac/common/index.jhtml?location=M1H1005G1002F2013P3042N4292 (printed Nov. 20, 2002).

(Continued)

*Primary Examiner*—Rafael Perez-Gutierrez
*Assistant Examiner*—Mazda Sabouri
(74) *Attorney, Agent, or Firm*—Sheridan Ross P.C.

(57) ABSTRACT

The present invention is directed to a telecommunications system 100 for routing a contact to a selected address, comprising (a) an input for receiving a contact message comprising a source address and a destination address of a subscriber communication device 116 associated with a subscriber and (b) mobility agent 160 for determining whether or not the source address in the contact message corresponds to a proxy server 128 and, when the source address corresponds to a proxy server 128, causing the contact not to be routed to a selected address and, when the source address does not correspond to a proxy server 128, causing the contact to be routed to the selected address.

39 Claims, 2 Drawing Sheets

U.S. PATENT DOCUMENTS

| | | | |
|---|---|---|---|
| 5,452,347 A | 9/1995 | Iglehart et al. | |
| 5,572,572 A | 11/1996 | Kawan et al. | 379/90.01 |
| 5,577,110 A | 11/1996 | Aquino | |
| 5,615,257 A | 3/1997 | Pezzullo et al. | 379/396 |
| 5,659,603 A | 8/1997 | Orlofsky | |
| 5,790,646 A | 8/1998 | Moon | |
| 5,794,156 A | 8/1998 | Alanara | 455/517 |
| 5,828,747 A | 10/1998 | Fisher et al. | |
| 5,905,793 A | 5/1999 | Flockhart et al. | |
| 5,956,655 A | 9/1999 | Suzuki et al. | 345/169 |
| 5,982,873 A | 11/1999 | Flockhart et al. | |
| 5,999,827 A | 12/1999 | Sudo et al. | 455/564 |
| 6,038,302 A | 3/2000 | Burok et al. | 379/201 |
| 6,044,403 A | 3/2000 | Gerszberg et al. | 709/225 |
| 6,163,607 A | 12/2000 | Bogart et al. | |
| 6,169,797 B1 | 1/2001 | Wildgrube et al. | 379/233 |
| 6,173,053 B1 | 1/2001 | Bogart et al. | |
| 6,192,122 B1 | 2/2001 | Flockhart et al. | |
| 6,203,192 B1 | 3/2001 | Fortman | |
| 6,204,848 B1 | 3/2001 | Nowlan et al. | 345/810 |
| 6,215,474 B1 | 4/2001 | Shah | 345/168 |
| 6,246,983 B1 | 6/2001 | Zou et al. | |
| 6,434,226 B1* | 8/2002 | Takahashi | 379/201.01 |
| 6,463,304 B2 | 10/2002 | Smethers | 455/566 |
| 6,516,061 B2* | 2/2003 | Horowitz et al. | 379/233 |
| 6,546,004 B2 | 4/2003 | Gullicksen | |
| 6,546,239 B1 | 4/2003 | Pazdersky et al. | 455/410 |
| 6,554,707 B1 | 4/2003 | Sinclair et al. | 463/39 |
| 6,567,075 B1 | 5/2003 | Baker et al. | 345/172 |
| 6,625,141 B1 | 9/2003 | Glitho et al. | |
| 6,665,723 B2 | 12/2003 | Trossen | |
| 6,668,173 B2 | 12/2003 | Greene | |
| 6,748,071 B2 | 6/2004 | Milton | 379/246 |
| 6,751,309 B2 | 6/2004 | Milton | 379/246 |
| 6,754,314 B2 | 6/2004 | Wengrovitz et al. | |
| 6,798,767 B1* | 9/2004 | Alexander et al. | 370/352 |
| 6,823,197 B1 | 11/2004 | Chen et al. | |
| 6,920,339 B1 | 7/2005 | Choy et al. | 455/566 |
| 6,937,597 B1 | 8/2005 | Rosenberg et al. | |
| 6,950,441 B1 | 9/2005 | Kaczmarczyk et al. | |
| 6,990,353 B2 | 1/2006 | Florkey et al. | |
| 6,996,076 B1 | 2/2006 | Forbes et al. | |
| 7,031,443 B2 | 4/2006 | St-Onge et al. | |
| 7,120,243 B2 | 10/2006 | Milton | |
| 7,149,506 B2 | 12/2006 | Osterhout et al. | |
| 7,197,124 B2 | 3/2007 | Hutchinson, IV | |
| 7,218,722 B1 | 5/2007 | Turner et al. | |
| 2002/0122547 A1* | 9/2002 | Hinchey et al. | 379/221.01 |
| 2002/0137490 A1* | 9/2002 | Gallant | 455/411 |
| 2002/0167946 A1* | 11/2002 | Gallant | 370/389 |
| 2003/0016810 A1 | 1/2003 | Milton | 379/242 |
| 2003/0016811 A1 | 1/2003 | Milton | 379/245 |
| 2003/0231748 A1* | 12/2003 | Novelline | 379/88.23 |
| 2005/0027867 A1 | 2/2005 | Mueller et al. | |
| 2005/0144008 A1* | 6/2005 | Groves et al. | 704/275 |

FOREIGN PATENT DOCUMENTS

| | | |
|---|---|---|
| EP | 1037451 | 9/2000 |
| JP | 05-260176 | 10/1993 |
| JP | 09-135320 | 5/1997 |
| WO | WO 01/35615 | 5/2001 |

OTHER PUBLICATIONS

Avaya Inc.'s "EC500 Key Features" at http://www.avaya.com/ac/common/index.jhtml?location=M1H1005G1015F2062P3142N4988 (printed Nov. 20, 2002).

Avaya Inc.'s "EC500: Product Summary" at http://www.avaya.com/ac/common/index.jhtml?location=M1H1005G1015F2062P3142N4986 (printed Nov. 20, 2002).

"IP LAN Telephony: the Technology Migration Imperative" Avaya Executive Briefing Paper (Feb. 2002), pp. 1-21.

"Avaya Announces New Enterprise Class IP Solutions (ECLIPS)" *Communication without Boundaries* (2002).

David Chavez et al., "Avaya MultiVantage™ Software: Adapting Proven Call Processing for the Transition to Converged IP Networks," *Communication without Boundaries* (Aug. 2002).

"SIP (Session Initiation Protocol) in Enterprise-Class IP Telephony Networks," Communication without Boundaries (2002).

Avaya Communications, "EC500 Extension to Cellular, Release 2, User's Guide," Issue 1 (Jul. 2001).

Avaya, "EC500 Extension to Cellular, Release 3, User's Guide," Issue 2 (Jan. 2001).

Avaya, "EC500 Extension to Cellular, Release 3 and Release 4, User's Guide," Issue 3 (Aug. 2002).

Avaya, "EC500 Extension to Cellular, Release 4, User's Guide," Issue 4 (Aug. 2002).

Bellcore, Bellcore Analog Display Services Interface (ADSI) SPCS/Server Generic Requirements, Document GR-1273-CORE, Issue 1, 7 pages, Jul. 1998.

DEFINITY.RTM., Enterprise Communications Server, Release 6, Administration and Feature Description, "Bridged Call Appearance," pp. 4-109 to 4-124, Aug. 1997.

DEFINITY.RTM., Enterprise Communications Server, Release 6, Administration and Feature Description, "Terminal Translation Initialization," pp. 4-562 to 4-569, Aug. 19907.

Aim Wireless, "Learn How to Type Using Your Phone," Mar. 13, 2003, available at http://www.aim.com/wireless/typing_messages.htm, 3 pages.

Avaya, "EC500 Extension to Cellular, Release 4, User's Guide," Issue 4 (Aug. 2002).

Lucent Technologies, "6408+, 6408D+, 6416D+M, 6424D+, and 6424D+M Telephones User's Guide," Issue 3, Apr. 1999, pp. 1-28.

Product Brochure, "Avaya Converged Communications Server," (2004), 6 pages.

Greenfield, David, "Avaya's SIP-Standardized IP Telephony" Network Magazine (Mar. 15, 2004), available at http://www.networkmagazine/shared/article/showArticle.jhtml?articleId=18200469, 2 pages.

3GPP Specifications: Plenary Meeting Details (printed Mar. 30, 2004) available at http://www.3gpp.org/ftp/Specs/html-info/PlenaryMeetings.htm, 44 pages.

Kiss, Krisztian, "Signalling flows for the IP multimedia call control based on Session Initiation Protocol (SIP) and Session Description Protocol (SDP); Stage 3" 3GPP TS Specification: 24.228 (printed Mar. 30, 2004) available at http://www.3gpp.org/ftp/Specs/html-info/24228.htm, 2 pages.

Drage, Keith, "Internet Protocol (IP) multimedia call control protocol based on Session Initiation Protocol (SIP) and Session Description Protocol (SDP); Stage 3" 3GPP TS Specification: 24.229 (printed Mar. 30, 2004) available at http://www.3gpp.org/ftp/Specs/html-info/24229.htm, 2 pages.

Segev, Uri, "AD405 SIP—What Can you Do With It?" IMB The Workplace for Innovation, Lotus Software, (undated) 49 pages.

Lektenius, Johan, "ISN Major Project," University of Technology, Sydney, Faculty of Engineering (2002), 30 pages.

\* cited by examiner

SUBSCRIBER MOBILITY IN TELEPHONY SYSTEMS

FIELD OF THE INVENTION

The present invention relates generally to communication systems and specifically to telecommunication systems using bridging functionality.

BACKGROUND OF THE INVENTION

In the fast-paced society of today, convenience is an important consideration for most people. In enterprise telecommunications switches and servers, for example it is important in certain types of calls that the callers be able to reach subscribers without numerous transfers, often only to reach a voice mailbox. Such slow, laborious, and inefficient connections can lead to customer and employee dissatisfaction and decreased productivity levels within an organization.

Bridging has been employed, for example by the EC500™ product of Avaya, Inc., to provide one-number portability and one-number access to anyone in an enterprise network. As used herein, "bridging" refers to the ability of a first communication device to answer (receive) or join contacts with a different, second communication device. Bridging, as enabled by the EC500™ product, allows for a high level of accessibility by seamlessly directing a call for a cellular phone to a designated telephone number, such as an office number, or vice versa. Both phones ring simultaneously, providing a subscriber with the option of answering on the cellular phone or the office desk set. The bridging is performed by bridging a call appearance on a line set to a virtual station that, when called, initiates a call to a selected provisioned cellular telephone number. This one-number portability is independent of the cellular standard in use. The system further provides call filtering (delivering only external calls, only internal calls, all calls or no calls to the cellular phone) and office caller ID (the cellular phone, when used to call into the enterprise switch/server, adopts the subscriber's office extension number).

The bridging system, however, can have limitations. First, the system can bridge only one call appearance for each provisioned virtual station. If a subscriber has multiple call appearances on his or her communication device, only one of the call appearances is bridged out for one provisioned virtual station. To bridge all call appearances, a separate corresponding virtual station must be provisioned, with a respective extension, for each separate call appearance, which is not only unnecessarily consumptive of scarce communications and processing resources but also expensive for businesses due to the need to upgrade to a system having an appropriate number of extensions. Second, the system does not relinquish call control decisions outboard. It merely bridges call routing decisions already made to a PSTN number. Telecommunication switches and servers now have circuit-switched and packed-switched capabilities and therefore deal with a wide variety of contact types other than traditional telephone calls and, consequently, of communication devices. As a result of this diversification, current communication devices have a wide range of intelligence capabilities compared to traditional digital and analog telephones. For example, the Session Initiation Protocol or SIP provides for intelligent endpoints, having autonomy and feature richness. Under the messaging scheme, which uses an "invite" message to accept a contact followed by various other messages, such as "trying", "ringing", "acknowledge", and "OK", the endpoints can refuse to accept a contact. Third, the system is enabled currently only for cellular phones.

SUMMARY OF THE INVENTION

These and other needs are addressed by the various embodiments and configurations of the present invention. The present invention relates generally to a methodology for bridging contacts to an intelligent communication device, typically a packet-switched communication device. As used herein, "contact" means a connection between two or more communication devices. The contact can be, for example, a telephone call, a chat session, a VoIP session, video session, application sharing session, white-board session, and gaming session, In one embodiment, a method for bridging a contact is provided that includes the steps of:

(a) receiving a contact message comprising a source address and a destination address associated with a subscriber; and (b) determining whether or not the source address in the contact message corresponds to a proxy server and when the source address corresponds to a proxy server, not bridging the contact to a specified address; and when the source address does not correspond to a proxy server, bridging the contact to the specified address. A "contact message" means a command or invitation to initiate a communication session while a "contact" refers to the communication session itself. Typically, the destination address corresponds to a communication device of a subscriber (or subscriber communication device) to an enterprise telecommunications system and a computational component of the enterprise telecommunications system performs the above steps. The enterprise telecommunications system is typically a Private Branch Exchange or PBX.

A "proxy server" refers to a computer that stores information acquired from other computational components on a network and makes it available to other computers in a defined area. The proxy server has packet-switched capabilities and can include predefined rules regarding contact routing and session management, redirect functions, routing to media gateways, and user authentication. Before routing a session to its addressee, the proxy server typically queries either a domain name server or a presence server.

In one configuration, the determining step maybe performed by comparing the source address with a proxy server address stored in memory of the enterprise telecommunications system and associated with the subscriber. The contact source is deemed to be a proxy server when the proxy server address is identical to the source address. When the contact source is not a proxy server, the contact referenced in the contact message is terminated (or processed normally).

In another configuration when the contact is to be bridged to a network communication device served by the proxy server, a ringer in the subscriber communication device is not activated and the contact is bridged to the network communication device. A call appearance on the subscriber communication device may be assigned to the contact. This step effectively defers to the proxy server to employ user configured rules regarding the appropriate coverage path for the contact, which may depend on the source of the contact.

In another configuration when the contact source is a proxy server, the methodology determines whether or not the contact associated with the contact message is an existing contact. When the contact is an existing contact, the ringer on the subscriber communication device is activated and the contact associated with the contact message is refused. When the contact is not an existing contact, the ringer on the subscriber communication device is not activated and the contact associated with the contact message is terminated or processed normally.

The methodology can provide a number of advantages.

By way of example, the methodology can provide an infrastructure that is open, standards-based, and interoperable, leverages telephony features normally available only in enterprise systems, such as a PBX, and supports first party call control, third party call control, call routing control, and control of enterprise network communication devices and trunks. This is so because the contact routing decisions are made not by the enterprise system but by an outboard feature server or proxy server that makes the contact routing decisions (e.g., find me, customized routing according to subscriber-generated rules, and routing decisions based on network policy rules). When the proxy server decides to alert the enterprise system, the proxy server will route the contact back to the system. The system will recognize that the contact is really associated with the contact which bridged out.

Second, the subscriber communication device can be provisioned so that all call appearances can be associated with a single bridging field. There is thus no need to provision a separate extension for each call appearance to effect bridging. This avoids unnecessary consumption of scarce communications and processing resources and expense for businesses due to the need to upgrade to a system having an appropriate number of extensions.

Third, bridging is enabled for communication devices, whether circuit-switched or packet-switched, in addition to cellular phones. This capability provides enhanced subscriber satisfaction and productivity.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
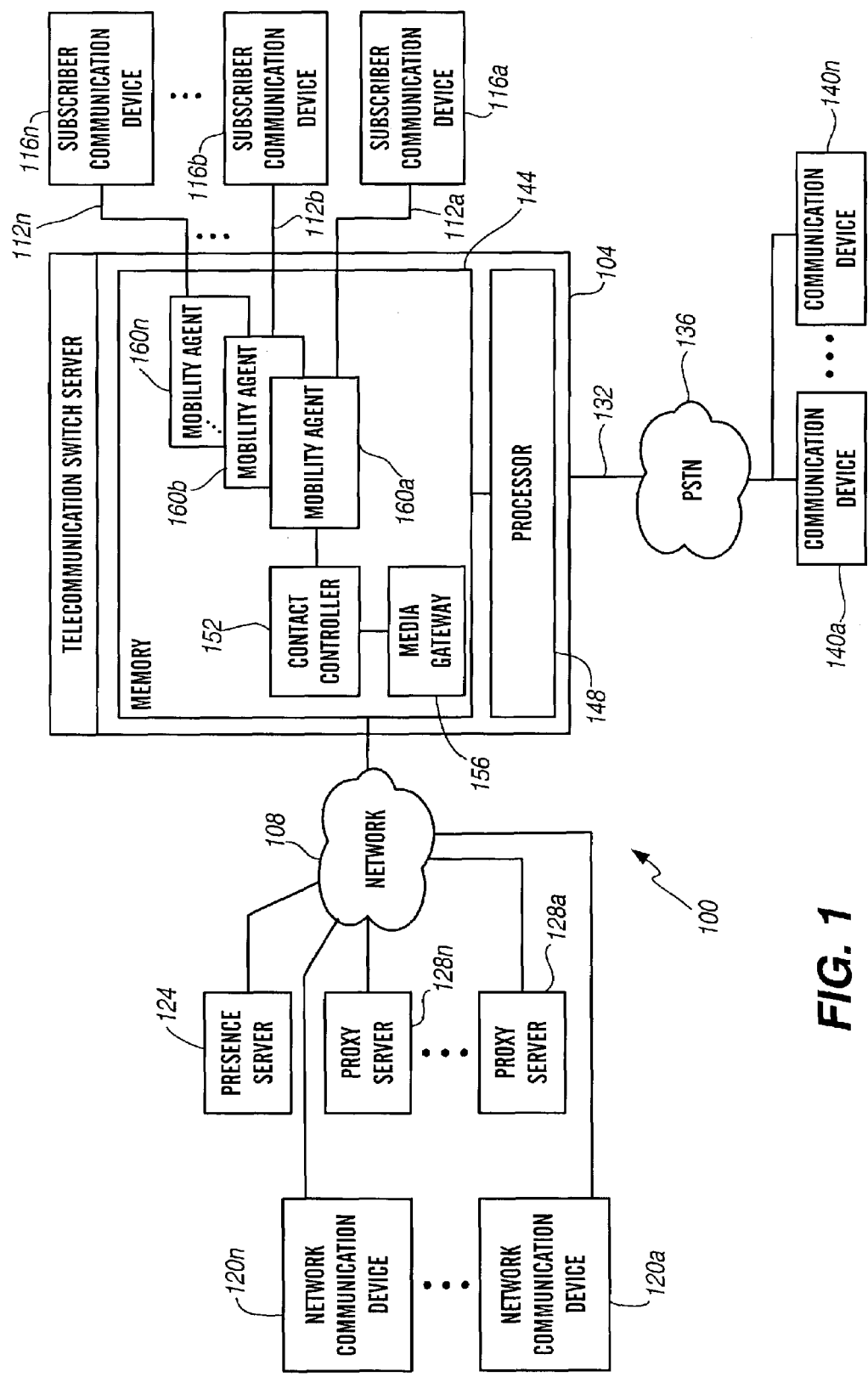
FIG. 1 is a block diagram of an architecture according to a first embodiment of the present invention.

FIG. 1 depicts a communications network according to a first architecture of the present invention. The network 100 comprises a telephony switch/server 104 for directing and processing incoming and outgoing contacts, a packet-switched network 108, a plurality of circuit-switched lines 112a-n, a first plurality of circuit-switched subscriber communication devices 116a-n in communication with the lines 112a-n, a second plurality of packet-switched network communication devices 120a-n in communication with the packet-switched network 108, a presence server 124 for providing presence information about one or more users of the various communication devices, a corresponding proxy server 128a-n connected to each of the second plurality of communication devices 120a-n, a trunk 132 connected to the Public Switched Telephone Network or PSTN 136, and a third plurality of circuit-switched communication devices 140a-n connected to the PSTN 136. As will be appreciated, telephony switch/server 104, presence server 124, and proxy servers 128a-n can be implemented in software and/or hardware, depending on the application, and can be combined or distributed as shown.

The telephony switch/media server 104 can be any architecture for directing contacts to one or more communication devices. Illustratively, the switch/server 104 of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ private-branch exchange (PBX)-based ACD system; Avaya Inc.'s MultiVantage™ PBX, or Avaya, Inc.'s, S8300™ media server. The switch or media server 104 typically is a stored-program-controlled system that conventionally includes interfaces to external communication links, a communications switching fabric, service circuits (e.g., tone generators, announcement circuits, etc.), memory 144 for storing control programs and data, and a processor 148 (i.e., a computer) for executing the stored control programs to control the interfaces and the fabric and to provide automatic contact-distribution functionality. The switch/server 104 comprises a network interface card (not shown) to provide services to the second plurality of communication devices 120a-n. Included in the memory 144 is a contact controller 152 for handling incoming and outgoing contacts, a media gateway 156 for signal conversion from packet-switched to circuit-switched and vice versa, and a plurality of mobility agents 160a-n servicing a corresponding one of the first plurality of subscriber communication devices 116a-n. Exemplary media gateways include Avaya, Inc.'s, G700 Media Gateway™ and may be implemented as hardware such as via an adjunct processor or chip in the switch/server.

The packet-switched network 108 can be any data and/or distributed processing network, such as the Internet. The network 108 typically includes proxies, registrars, and routers for managing packet flows.

The first, second, and third plurality of communication devices 1116a-n, 120a-n, and 140a-n can be any communication device suitable for the network to which they are connected. The first and third plurality of communication devices are connected to a circuit-switched network and can include, for example, wired and wireless telephones, PDAs, pagers, facsimile machines, modems, H.320 video phones and conferencing units, voice messaging and response units, traditional computer telephony adjuncts, and loudspeaker paging and announcement units. The second plurality of communication devices are connected to the packet-switched network 108 and can include, for example, IP hardphones such as the Avaya, Inc.'s, 4600 Series IP Phones™, IP softphones such as Avaya, Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and packet-based loudspeaker paging and announcement units.

The presence server 124 collects presence information about a communication device and/or user thereof and stores the collected information in a presence information database. The presence server 124 provides the collected information to other network entities in response to queries. The presence server 124 can collect information respecting the user's interaction with the various entities of FIG. 1 and/or other information provided directly or indirectly by the user. For example, the presence server 124 can interact with a presence service (not shown) that continually collects and redistributes availability data from publishing sources authorized by the user.

The proxy servers 128*a*-*n* are responsible for contact routing and session management. It can also perform redirect functions, routing to media gateways, and user authentication. Before routing a session to its addressee, the proxy server queries one or more of a domain name server, the presence server, or other location server.

In a preferred configuration, the telephony switch/media server 104, network 108, second plurality of communication devices 120*a*-*n*, presence server 124, and proxy servers 128*a*-*n* are Session Initiation Protocol or SIP compatible and can include interfaces for various other protocols such as the Lightweight DirectoryAccess Protocol or LDAP, H.248, H.323, Simple Mail Transfer Protocol or SMTP, IMAP4, ISDN, E1/T1, and analog line or trunk.

To provide a more effective provisioning mechanism for contact bridging, in one configuration the profile associated with each subscriber communication device 116*a*-*n* in memory 144 includes a bridging field (yes/no) indicating whether or not bridging is to be performed for incoming contacts to the device 116 or outgoing contacts from the device 116. The profile includes a further (address) field containing one or more addresses (or telephone numbers) to which a contact is to be initiated or bridged. In another configuration, the profile is configured as a virtual station having a separate extension and corresponding to the communication device 116. In this configuration, an "X" is placed in the port equipment field location, as has been traditionally done in prior art administration-without-hardware provisioning. This indicates that no physical equipment has been assigned to the profile or that the profile is for a virtual station. The bridging and address fields are completed as noted previously. In this manner, provisioning is greatly simplified. A separate provisioned extension number for each call appearance on the communication device is no longer required.

To demonstrate these concepts, a simple example will be presented. Assume that network communication device 120*a* initiates a contact directed to subscriber communication device 116*a* and that subscriber communication device 116*a* (i.e., a digital (wired) desk phone) has a corresponding virtual station that is to bridged to communication device 140*a*, which is a cellular phone associated with the same subscriber as device 116*a*. Proxy server 128*a*, which services the network communication device 120*a*, directs the contact through the network 108 to the telecommunication switch/server 104. Contact controller 152 reviews the contact addressee's address or telephone number, retrieves the appropriate records from memory, and directs the contact to line-side subscriber communication device 116*a* and to its corresponding virtual station. The virtual station initiates a contact to trunk-side communication device 140*a*. The switch/server 104 initiates a timer for call coverage rule application and directs the contact to communication device 116*a*. The incoming contact appears on the call appearances of both communication devices 116*a* and 140*a* and both devices 116*a* and 140*a* are rung to indicate receipt of the contact. The subscriber can answer the contact from either device. If the contact is answered on one of the devices, the other device automatically terminates ringing and displaying a call appearance corresponding to the contact. If the contact is not answered after a selected number of rings, the coverage path rules are invoked, which typically means that the contact is directed to the subscriber's voice mail or to an assistant/operator.

The above provisioning mechanism can also be used for directing a contact to a packet-switched network communication device corresponding to the subscriber. In that event the address identified in the address field is the address for the network communication device 120. When the outgoing contact is initiated to the network communication device in response to an incoming contact, the virtual station, for SIP, forwards, by means of the corresponding proxy server 128, an invitation to the device 120, which then sends an appropriate response to the virtual station.

When a subscriber is associated with both circuit-switched and packet-switched communication devices, there can be problems when bridging is in effect for the subscriber.

First, assume that a first subscriber is associated with circuit-switched subscriber communication device 116*n* and packet-switched communication device 120*n* and that proxy server 128*n* has predefined rules directing a contact for the first subscriber to be routed to each of the devices 116*n* and 120*n*. If a second subscriber associated with the network communication device 120*a* directs a contact to the subscriber communication device 116*n*, the telecommunication switch/server 104 directs the contact to the device 116*n* and bridges the contact to the network communication device 120*n*. The proxy server 128*n*, when it receives the invite message from the switch/server 104 intended for the network communication device 120*n*, will forward an invite message back to the switch/server 104 addressed to device 116*n*. The problem is device 116*n* is already ringing and displaying the contact on a first call appearance. The invite message is directed by the switch/server 104 to the device 116*n*, which selects a second call appearance for the contact. Simultaneously, the contact is bridged back to the network communication device 120*n* via proxy server 128*n*. The process is repeated until device 116*n* runs out of available call appearances. This "looping" process can create substantial network congestion, be annoying to subscribers, and prevent the subscribers from receiving different contacts on other call appearances.

Second, assume that the predefined rules in the proxy server 128*n* are that an incoming contact from the second subscriber are not to be directed to communication device 116*n*. The first subscriber has decided to place a contact from the second subscriber on a blocked calling list. The problem is, when the contact is directed to device 116*n* and then bridged to network communication device 128*n*, these rules are violated because device 116*n* is already being rung by the time the proxy server 128*n* receives the contact.

Both of the problems result from a lack of cooperation between the switch/server 104 and the proxy server 128*n*. Each node is configured to try to control the processing of an incoming contact, which can result in conflicts.

The method for performing bridging of incoming and outgoing contacts (from/to communication devices 116*a*-*n* and 140*a*-*n* (e.g., digital or analog telephones) and 120*a*-*n* (e.g., IP hard phones or IP softphones), while avoiding conflicts, will now be described with reference to FIGS. 2-3.

Figure 2:
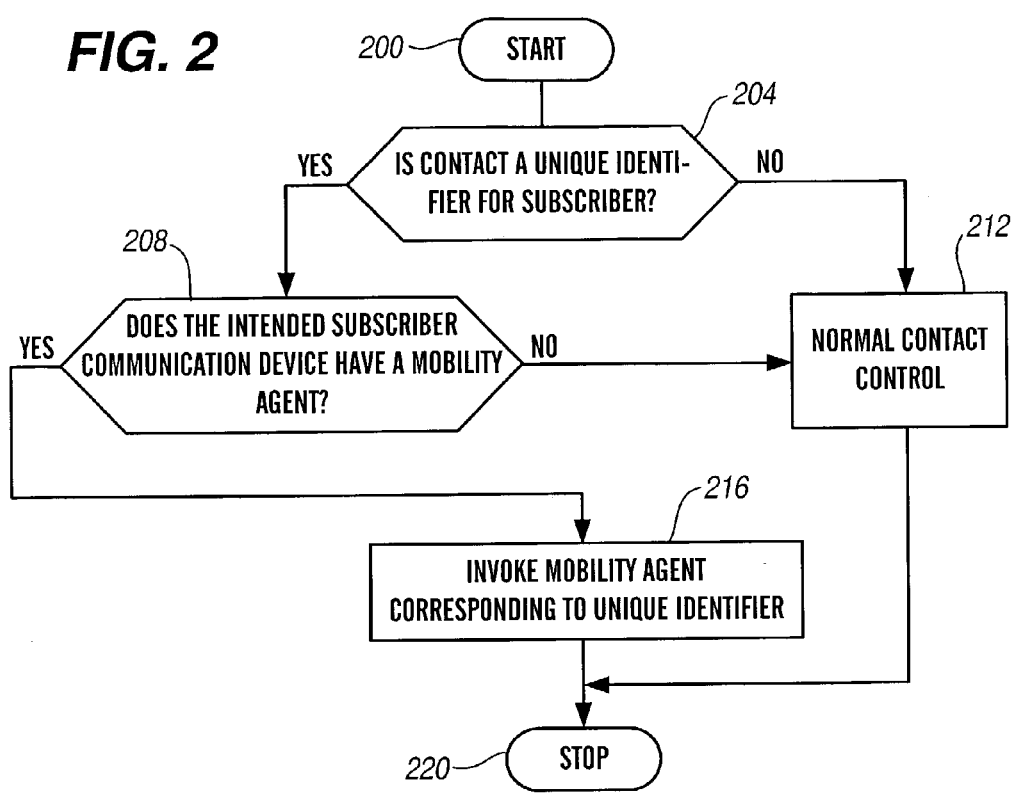
FIG. 2 is a flow chart of contact controller operation according to a second embodiment of the present invention.

Referring to FIG. 2, contact controller 152 in step 200 receives an incoming or outgoing contact message referencing a contact. In decision diamond 204, the controller 152 determines whether or not the unique (addressee) identifier identified by the contact message (e.g., an invite message, and the like) is directed to a subscriber (which is the case for an incoming contact and some outgoing contacts). The identifier can be any unique address, such as a telephone number, Uniform Resource Locator or URL, Uniform Resource Indicator or URI, IP address, and the like. If not, the controller 152 proceeds to step 212 and performs normal contact control processing understood by those of ordinary skill in the art. Typically, such functions are the functions associated with termination of a call. If so, the controller 152 proceeds to decision diamond 208.

In decision diamond 208, the controller 152 determines whether or not the intended subscriber communication device 116 has a corresponding mobility agent 160. If not, the controller 152 proceeds to step 212 discussed previously. If so, the controller proceeds to step 216.

In step 216, the controller 152 invokes the mobility agent 160 corresponding to the unique identifier and terminates operation in step 220. Typically, the controller 152 performs certain contact processing functions respecting the contact. These functions include activating a timer for the contact to permit application of time out and coverage path rules.

Figure 3:
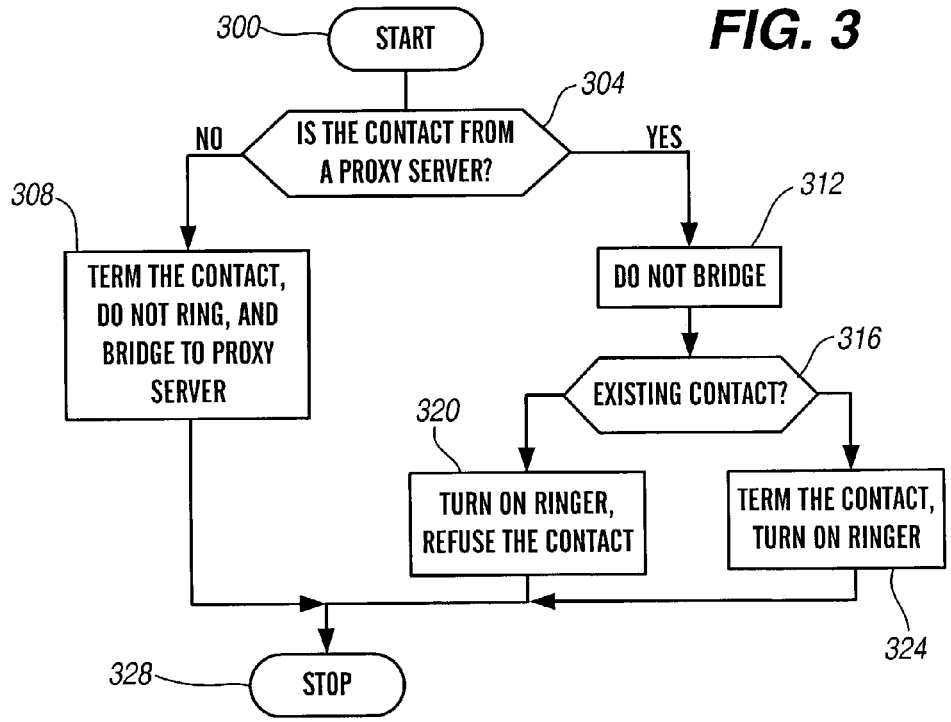
FIG. 3 is a flow chart of mobility agent operation according to a third embodiment of the present invention.

Referring now to FIG. 3, the operation of the invoked mobility agent 160 will be now be discussed. In step 300, the mobility agent 160 receives the contact message from the contact controller 152. In decision diamond 304, the mobility agent determines whether or not the contact message is from a proxy server corresponding to the intended subscriber (addressee or intended recipient). This determination is typically effected using provisioning information for the proxy server. Such information is stored in memory 144 as part of the profile of the subscriber associated with the unique identifier or destination address. The stored information is compared with the source address identified in the contact message and, if identical, the agent 160 concludes that the message is from the proxy server servicing the subscriber.

When the contact message is not from the subscriber's proxy server, the agent 160, in step 308, terminates the contact (e.g., selects a call appearance on the device 116 and displays an appropriate message on the display of the device, and the like) without activating the ringer of the device 116, and bridges the contact to the communication device 120 corresponding to the subscriber identified in the bridging address field (when the bridging field indicator indicates to bridge). The selection of a call appearance without activating the ringer permits a proxy server to apply user defined rules, such as block caller lists, while permitting the subscriber to pick up the contact on the communication device. For example, the subscriber may answer the contact on his cellular phone and, when he can access his desk phone, pick up the contact on the desk phone. In one configuration, a call appearance is not selected on the device 116 for the contact. The agent 160 then terminates operation in step 328. When the contact message is from the subscriber's proxy server (which may be the case after step 308 is performed), the agent 160 proceeds to step 312 and does not bridge the contact to another device, even when the bridging field contains a rule to bridge to a number or address specified in the address field (which may include communication device 140).

In decision diamond 316, the agent 160 determines whether or not the contact message corresponds to an existing (already received and active) contact. In other words, the agent 160 determines whether the contact message is part of a contact previously bridged to another communication device. As will be appreciated, the contact message comprises a unique identifier, such as a call ID, a source address, a destination address, and various tags. These variables are preserved by the proxy server when the invite message is generated. The fields compared against the records (one or more of the call ID and the source and destination address fields of current contacts) in memory 144 to determine if the message corresponds to an existing contact. When there is complete identity among these fields, the contact is considered to be an existing contact. When the contact message corresponds to an existing contact, the agent 160 in step 320 forwards a message to the appropriate subscriber communication device 116 commanding the ringer to be activated and refuses the contact. In standard telephony protocols, refusing the contact means generating a tear down command with respect to the contact. In SIP, refusing the contact means that the agent 160 declines to accept the invite message and returns a denial to the proxy server. This is so because a refusal to accept the contact will prevent the contact from being bridged again to the device 120 by the switch/server, thereby avoiding looping back and forth until all call appearances are occupied. In either case, no call appearance is selected and used for the contact. When the contact message does not correspond to an existing contact, the agent 160 in step 324 forwards a message to the appropriate subscriber communication device 116 commanding the ringer to be activated and terminates the contact (accepts or receives the contact associated with the contact message).

The algorithm of FIG. 3 overcomes the problems identified above. When a contact is initially routed to a communication device 116a-n, the contact is bridged out to the address in the address field but the device 116a-n is not alerted. In other words, the ringer for the device 116a-n is not activated. The contact is bridged out to an outboard feature server or proxy server that makes the contact routing decisions (e.g., find me, customized routing according to subscriber-generated rules, and routing decisions based on network policy rules). When the proxy server decides to alert the switch/server, the proxy server will route the contact back to the switch/server. The agent 160 will recognize that the contact is really associated with the contact which bridged out. The agent 160 then alerts the device 116a-n (by turning on the ringer). The proxy server 128 can alert other subscriber-specified or otherwise preselected communication devices, either directly or via switch/server. Contacts using this methodology can route consistently whether they originate in the switch/server or in the domain of the proxy server. The agent will operate not only with devices having profiles directly configured to bridge or with virtual ("administration without hardware") stations for subscribers wanting the features without the actual device.

A number of variations and modifications of the invention can be used. It would be possible to provide for some features of the invention without providing others.

For example in one alternative embodiment, the various components or modules can be implemented as hardware or software or a combination thereof and can be implemented in different ways. For example, the steps noted above for each module can be performed by other modules, depending on the application.

In another alternative embodiment, protocols other than those discussed above can be used with one or more of the above embodiments. For example, protocols that can be used in addition to or in lieu of SIP include H.323, Integrated Services Digital Network, ISDN, and analog caller ID.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a telecommunications system comprising a plurality of circuit-switched communication devices corresponding to a plurality of subscribers, a plurality of packet-switched communication devices corresponding to the plurality of subscribers, and at least one of a switch and server, the at least one of a switch and server being in communication with a packet-switched network comprising a plurality of proxy servers and a circuit-switched network and at least one of proxy server has a set of predefined rules directing a contact for a first subscriber to the first subscriber's circuit-switched communication device, a method for bridging a contact comprising:

(a) setting up a first contact with the first subscriber's circuit-switched communication device;

(b) in response to step (a), the at least one of a switch and server generating a first contact message related to the first contact and comprising a source address other than a source address of the at least one proxy server and a destination address;

(c) applying the following rules to the first contact message:

(C1) when a source address of a contact message corresponds to a proxy server, not bridging a corresponding contact to a subscriber's packet-switched communication device; and (C2) when the source address of the contact message does not correspond to a proxy server, bridging the corresponding contact to the subscriber's packet-switched communication device;

(d) in response to step (c), bridging the first contact to the first subscriber's packet-switched communication device;

(e) receiving, from the at least one proxy server, a second contact message related to the first contact message and comprising a source address of the at least one proxy server and a destination address of at least one of the communication devices associated with the first subscriber;

(f) applying the rules (C1) and (C2); and (g) in response to step (f), not bridging a contact associated with the second contact message to the first subscriber's packet-switched communication device.

2. The method of claim 1, wherein the at least one of a switch and server and the communication devices in the telecommunication system are part of an enterprise telecommunications system.

3. The method of claim 1, wherein the applying step (f) comprises the step of:

comparing the source address of the second contact message with a proxy server address stored in a memory of the enterprise telecommunications system in association with the first subscriber.

4. The method of claim 3, wherein, in step (c), the source address of a selected contact message corresponds to a proxy server when the proxy server address is identical to the source address of the selected contact message.

5. The method of claim 1, wherein, when a source address of the selected contact message does not correspond to a proxy server, the following rule is applied:

terminating a selected contact associated with the selected contact message.

6. The method of claim 5, wherein, when contact termination requires the selected contact to be bridged to a selected subscriber's packet-switched communication device served by the proxy server, further comprising application of the rules:

not activating a ringer in the selected subscriber's circuit-switched communication device; and bridging the contact to the selected subscriber's packet-switched communication device.

7. The method of claim 6, wherein contact termination requires the selected contact to be bridged to the selected subscriber's packet-switched communication device, wherein a call appearance is selected on the selected subscriber's circuit-switched communication device and an appropriate message displayed on the selected subscriber's circuit-switched communication device's display, thereby permitting the proxy server to apply user defined rules while permitting the selected subscriber to pick up the contact on the selected subscriber's circuit-switched communication device and wherein the second contact message is received by the at least one of a switch and server and the proxy server is geographically dislocated from the at least one of the switch and server.

8. The method of claim 6, further comprising application of a rule that a contact from a proxy server is not bridged even when a provisioned bridging field corresponding to an addressed subscriber communication device contains a rule to bridge to the specified address.

9. The method of claim 1, wherein, when the source address in the selected contact message is a proxy server, further comprising:

determining whether the selected contact associated with the selected contact message is an existing contact.

10. The method of claim 9, wherein, when the selected contact referenced in the selected contact message is an existing contact, further comprising:
activating a ringer on the selected subscriber's communication device; and
refusing the selected contact associated with the selected contact message.

11. The method of claim 10, wherein the selected contact is an existing contact when at least one of call identifier and source and destination address fields in the selected contact message matches the corresponding field(s) in a record of an existing contact and wherein, when the selected contact referenced in the selected contact message is not an existing contact, further comprising:
activating a ringer on the selected subscriber's communication device; and
terminating the selected contact associated with the selected contact message.

12. The method of claim 9, wherein the applying step (c) comprises the step of:
comparing at least one of a unique identifier and the source address contained in the selected contact message with a corresponding at least one of a stored unique identifier and source address and
when the at least one of a unique identifier and source address in the selected contact message are each the same as the corresponding at least one of a stored unique identifier and source address, the selected contact referenced in the selected contact message is deemed to be an existing contact.

13. A computer readable medium comprising processor executable instructions to perform the steps of claim 1.

14. A telecommunications system, comprising:
a plurality of circuit-switched communication devices corresponding to a plurality of subscribers,
a plurality of packet-switched communication devices corresponding to the plurality of subscribers, and
at least one of a switch and server, wherein the at least one of a switch and server is in communication with a packet-switched network comprising a plurality of proxy servers and a circuit-switched network, wherein at least one proxy server has a set of predefined rules directing a contact for a first subscriber to the first subscriber's circuit-switched communication device, wherein the at least one of a switch and server generates and sends a first contact message related to a first contact and comprising a source address other than a source address associated with the at least one proxy server and a destination address and wherein the at least one of a switch and server comprises a mobility agent operable to:
(a) apply the following rules:
(a1) when a source address of a selected contact message corresponds to a proxy server, not bridging the contact to a selected subscriber's packet-switched communication device; and
(a2) when the source address of a selected contact message does not correspond to a proxy server, bridging the contact to the selected subscriber's packet-switched communication device;
(b) receive a second contact message related to the first contact message and comprising a source address of the at least one proxy server and a destination address of at least one of the communication devices associated with the first subscriber;
(c) apply the rules (a1) and (a2); and
(d) in response, not bridge a second contact associated with the second contact message to the first subscriber's packet-switched communication device.

15. The system of claim 14, wherein the at least one of a switch and server and communication devices in the telecommunication system are part of an enterprise telecommunications system.

16. The system of claim 15, wherein the apply operation (c) comprises the sub-operation:
comparing the source address of the second contact message with a proxy server address stored in a memory of the enterprise telecommunications system in association with the first subscriber.

17. The system of claim 16, wherein, in the apply operation (a), the source address of a selected contact message corresponds to a proxy server when the proxy server address is identical to the source address of the selected contact message.

18. The system of claim 14, wherein, when a source address of the selected contact message does not correspond to a proxy server, the following rule is applied by the mobility agent:
terminating a selected contact associated with the selected contact message.

19. The system of claim 17, wherein, when contact termination requires the selected contact to be bridged to a selected subscriber's packet-switched communication device served by the proxy server, further comprising application of the rules:
not activating a ringer in the selected subscriber's circuit-switched communication device; and
bridging the contact to the selected subscriber's packet-switched communication device.

20. The system of claim 19, wherein contact termination requires the selected contact to be bridged to the selected subscriber's packet-switched communication device, wherein a call appearance is selected on the selected subscriber's circuit-switched communication device and an appropriate message displayed on the selected subscriber's circuit-switched communication device's display, thereby permitting the proxy server to apply user defined rules while permitting the selected subscriber to pick up the contact on the selected subscriber's circuit-switched communication device and wherein the second contact message is received by the at least one of a switch and server and the proxy server is geographically dislocated from the at least one of the switch and server.

21. The system of claim 19, further comprising application of a rule that a contact from a proxy server is not bridged even when a provisioned bridging field corresponding to an addressed subscriber communication device contains a rule to bridge to the specified address.

22. The system of claim 14, wherein, when the source address in the selected contact message is a proxy server, further comprising the operation:
determining whether the selected contact associated with the selected contact message is an existing contact.

23. The system of claim 22, wherein, when the selected contact referenced in the selected contact message is an existing contact, further comprising the operations:
activating a ringer on the selected subscriber's communication device; and
refusing the selected contact associated with the selected contact message.

24. The system of claim 23, wherein the selected contact is an existing contact when at least one of call identifier and source and destination address fields in the selected contact message matches the corresponding field(s) in a record of an existing contact and wherein, when the selected contact referenced in the selected contact message is not an existing contact, further comprising the operations:

activating a ringer on the selected subscriber's communication device; and terminating the selected contact associated with the selected contact message.

25. The system of claim 22, wherein the determining operation (a) comprises the sub-operations:

comparing at least one of a unique identifier and the source address contained in the selected contact message with a corresponding at least one of a stored unique identifier and source address and when the at least one of a unique identifier and source address in the selected contact message are each the same as the corresponding at least one of a stored unique identifier and source address, the selected contact referenced in the selected contact message is deemed to be an existing contact.

26. In a telecommunications system comprising a plurality of circuit-switched communication devices corresponding to a plurality of subscribers, a plurality of packet-switched communication devices corresponding to the plurality of subscribers, and at least one of a switch and server, the at least one of a switch and server being in communication with a packet-switched network comprising a plurality of proxy servers and a circuit-switched network and at least one of the proxy servers having a set of predefined rules requiring any contact for a first subscriber from a second subscriber not to be directed to the first subscriber's circuit-switched device, a method comprising:

(a) determining whether contact termination requires a selected contact to be bridged to a selected subscriber's packet-switched communication device served by the at least one proxy server by applying the following rules:

(A1) when a source address of a contact message corresponds to a proxy server, not bridging a corresponding contact to a subscriber's packet-switched communication device; and (A2) when the source address of the contact message does not correspond to a proxy server, bridging the corresponding contact to the subscriber's packet-switched communication device; and (b) when contact termination requires the selected contact to be bridged to a selected subscriber's packet-switched communication device served by the at least one proxy server, applying the following rules:

(b1) not activating a ringer in the selected subscriber's circuit-switched communication device; and (b2) bridging the contact to the selected subscriber's packet-switched communication device, thereby permitting the at least one proxy server to apply user defined rules; and (c) when contact termination does not require the selected contact to be bridged to a selected subscriber's packet-switched communication device served by the at least one proxy server, not applying rules (b1) and (b2).

27. The method of claim 26, wherein contact termination requires a first contact to the first subscriber to be bridged to the first subscriber's packet-switched communication device, wherein a call appearance is selected on the first subscriber's circuit-switched communication device and an appropriate message displayed on the first subscriber's circuit-switched communication device's display, thereby permitting the at least one proxy server to apply rules defined by the first subscriber while permitting the first subscriber to pick up the first contact on the first subscriber's circuit-switched communication device.

28. The method of claim 26, wherein a first subscriber has corresponding packet-switched and circuit-switched communication devices and wherein the set of predefined rules requires a contact for a first subscriber to be directed to the first subscriber's circuit-switched and packet communication devices and further comprising:

(c) setting up a first contact with a first subscriber's circuit-switched communication device;

(d) bridging the first contact to the first subscriber's packet-switched communication device by sending a first contact message to the first subscriber's packet-switched communication device;

(e) in response to step (d), the at least one proxy server forwarding a second contact message to the at least one of a switch and server, the second contact message being related to the first contact message;

(f) receiving, from the at least one proxy server, the second contact message and comprising a source address of the at least one proxy server and a destination address of at least one of the communication devices associated with the first subscriber; and (g) applaying the rules of step (a), wherein, in response to step (g), a second contact associated with the second contact message is not bridged to the first subscriber's packet-switched communication device.

29. The method of claim 28, wherein a common contact message contains the source and destination addresses and wherein the at least a switch and server and communication devices in the telecommunication system is part of an enterprise telecommunications system.

30. The method of claim 28, wherein the determining step (g) comprises the step of:

comparing the source address of the second contact message with a proxy server address stored in a memory of the enterprise telecommunications system in association with the first subscriber.

31. The method of claim 28, wherein the source address of a selected contact message corresponds to a proxy server when the proxy server address is identical to the source address of the selected contact message.

32. The method of claim 28, wherein, when a source address of the selected contact message does not correspond to a proxy server, the following rule is applied:

terminating a selected contact associated with the selected contact message.

33. The method of claim 28, wherein contact termination requires the selected contact to be bridged to a selected subscriber's packet-switched communication device served by the proxy server, and wherein rules (b1) and (b2) are applied.

34. The method of claim 33, further comprising application of a rule that a contact from a proxy server is not bridged even when a provisioned bridging field corresponding to an addressed subscriber communication device contains a rule to bridge to the specified address.

35. The method of claim 28, wherein, when the source address in the selected contact message is a proxy server, further comprising:

(h) determining whether the selected contact associated with the selected contact message is an existing contact.

36. The method of claim 35, wherein, when the selected contact referenced in the selected contact message is an existing contact, further comprising:

activating a ringer on the selected subscriber's communication device; and refusing the selected contact associated with the selected contact message.

37. The method of claim 35, wherein the selected contact is an existing contact when at least one of call identifier and source and destination address fields in the selected contact message matches the corresponding field(s) in a record of an existing contact and wherein, when the selected contact referenced in the selected contact message is not an existing contact, further comprising:

activating a ringer on the selected subscriber's communication device; and terminating the selected contact associated with the selected contact message.

38. The method of claim 35, wherein the determining step (g) comprises the step of:

comparing at least one of a unique identifier and the source address contained in the selected contact message with a corresponding at least one of a stored unique identifier and source address and when the at least one of a unique identifier and source address in the selected contact message are each the same as the corresponding at least one of a stored unique identifier and source address, the selected contact referenced in the selected contact message is deemed to be an existing contact.

39. A computer readable medium comprising processor executable instructions to perform the steps of claim 26.

* * * * *